United States Patent
Allo et al.

(10) Patent No.: US 9,768,952 B1
(45) Date of Patent: Sep. 19, 2017

(54) REMOVABLE CIRCUIT FOR UNLOCKING SELF-ENCRYPTING DATA STORAGE DEVICES

(71) Applicant: Seagate Technology LLC, Cupertino, CA (US)

(72) Inventors: Christopher Allo, Lyons, CO (US); Saheb Biswas, Jharkhand (IN)

(73) Assignee: Seagate Technology LLC, Cupertino, CA (US)

( * ) Notice: Subject to any disclaimer, the term of this patent is extended or adjusted under 35 U.S.C. 154(b) by 174 days.

(21) Appl. No.: 14/862,128

(22) Filed: Sep. 22, 2015

(51) Int. Cl.
| | |
|---|---|
| *H04L 29/06* | (2006.01) |
| *H04L 9/08* | (2006.01) |
| *G06F 21/80* | (2013.01) |

(52) U.S. Cl.
CPC ............ *H04L 9/083* (2013.01); *G06F 21/80* (2013.01)

(58) Field of Classification Search
CPC ................................ H04L 9/083; G06F 21/80
See application file for complete search history.

(56) References Cited

U.S. PATENT DOCUMENTS

| | | | |
|---|---|---|---|
| 6,950,523 B1 | 9/2005 | Brickell et al. | |
| 7,877,603 B2 | 1/2011 | Goodman et al. | |
| 7,953,978 B2 | 5/2011 | Greco et al. | |
| 8,254,577 B2 | 8/2012 | Almoustafa et al. | |
| 8,300,831 B2 | 10/2012 | Kahler et al. | |
| 8,494,170 B2 | 7/2013 | Kahler et al. | |
| 8,694,434 B1* | 4/2014 | Kley | G06F 21/125 705/59 |
| 8,995,654 B2 | 3/2015 | Tang et al. | |
| 9,203,819 B2* | 12/2015 | Fenton | H04L 63/0869 |
| 9,460,317 B2* | 10/2016 | Nimura | G06F 21/78 |
| 2007/0234060 A1* | 10/2007 | Tsubono | G06F 21/31 713/176 |
| 2009/0260064 A1* | 10/2009 | McDowell | G06F 21/10 726/4 |
| 2009/0290710 A1* | 11/2009 | Tkachenko | G06F 21/10 380/203 |
| 2011/0261964 A1* | 10/2011 | Kahler | H04L 9/0825 380/286 |

(Continued)

OTHER PUBLICATIONS

Forg, Fabian, et al. "Client-Side Encryption and Dynamic Group Management for a Secure Network Storage Service.", Retrieved from http://www.ffoerg.de/doc/foerg_fabian_master_thesis.pdf , (2012).*

(Continued)

*Primary Examiner* — Chau Le
*Assistant Examiner* — Muhammad Chaudhry
(74) *Attorney, Agent, or Firm* — Cesari & Reed, LLP; Kirk A. Cesari; Logan Brown (57) ABSTRACT

Data storage devices ("DSDs") can be cryptographically locked, and may be unlocked with encryption keys. One or more encryption keys may be stored remotely in a key server, and may be retrieved by a removable circuit that can be coupled to a server, such as a data server, email server, file system server, other server, or other system. The removable circuit can determine which of the DSDs are locked, and may transmit a request to the key server for encryption keys corresponding to the locked DSDs. The removable circuit can unlock the locked DSDs with the encryption keys provided by the key server.

16 Claims, 6 Drawing Sheets

(56) References Cited

U.S. PATENT DOCUMENTS

2012/0125999 A1* 5/2012 Komatsu ............... E05B 35/007
235/382
2016/0277362 A1* 9/2016 Baumgarte ......... H04L 63/0428

OTHER PUBLICATIONS

Ouellet, Seagate Secure Self-Encrypting Drives with LSI MegaRAID SafeStore Encryption Services for Servers, Product Brief, LSI, San Jose, CA, 2013, 3 pages. file:///C:/Users/CR%20Docket/Downloads/LSI-PB-Seagate-SED-SafeStore.pdf.

* cited by examiner

REMOVABLE CIRCUIT FOR UNLOCKING SELF-ENCRYPTING DATA STORAGE DEVICES

SUMMARY

In some embodiments, an apparatus may include a circuit configured to connect to be removable from a first server, transmit from the first server to a second server a request for an encryption key corresponding to a data storage device ("DSD") coupled to the first server, and receive the encryption key from the second server. The circuit may further be configured to unlock the DSD with the encryption key.

In some embodiments, a system may include a management device configured to connect to be removable from a first server. The management device may include an interface circuit, and a memory including executable instructions that, when executed by a processor, cause the processor to transmit to a second server a request for an encryption key corresponding to a data storage device ("DSD") coupled to the first server via the interface circuit, receive the encryption key from the second server, and unlock the DSD with the encryption key.

In some embodiments, a method may include transmitting to a second server a request for an encryption key corresponding to a data storage device ("DSD"), where the DSD is coupled to a first server, receiving the encryption key from the second server, and unlocking the DSD with the encryption key.

DETAILED DESCRIPTION

In the following detailed description of the embodiments, reference is made to the accompanying drawings which form a part hereof, and in which are shown by way of illustrations. Features of the various described embodiments may be combined, other embodiments may be utilized, and structural changes may be made without departing from the scope of the present disclosure. Features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a data storage device (e.g. a solid state drive, a hard drive, or a combination thereof). Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
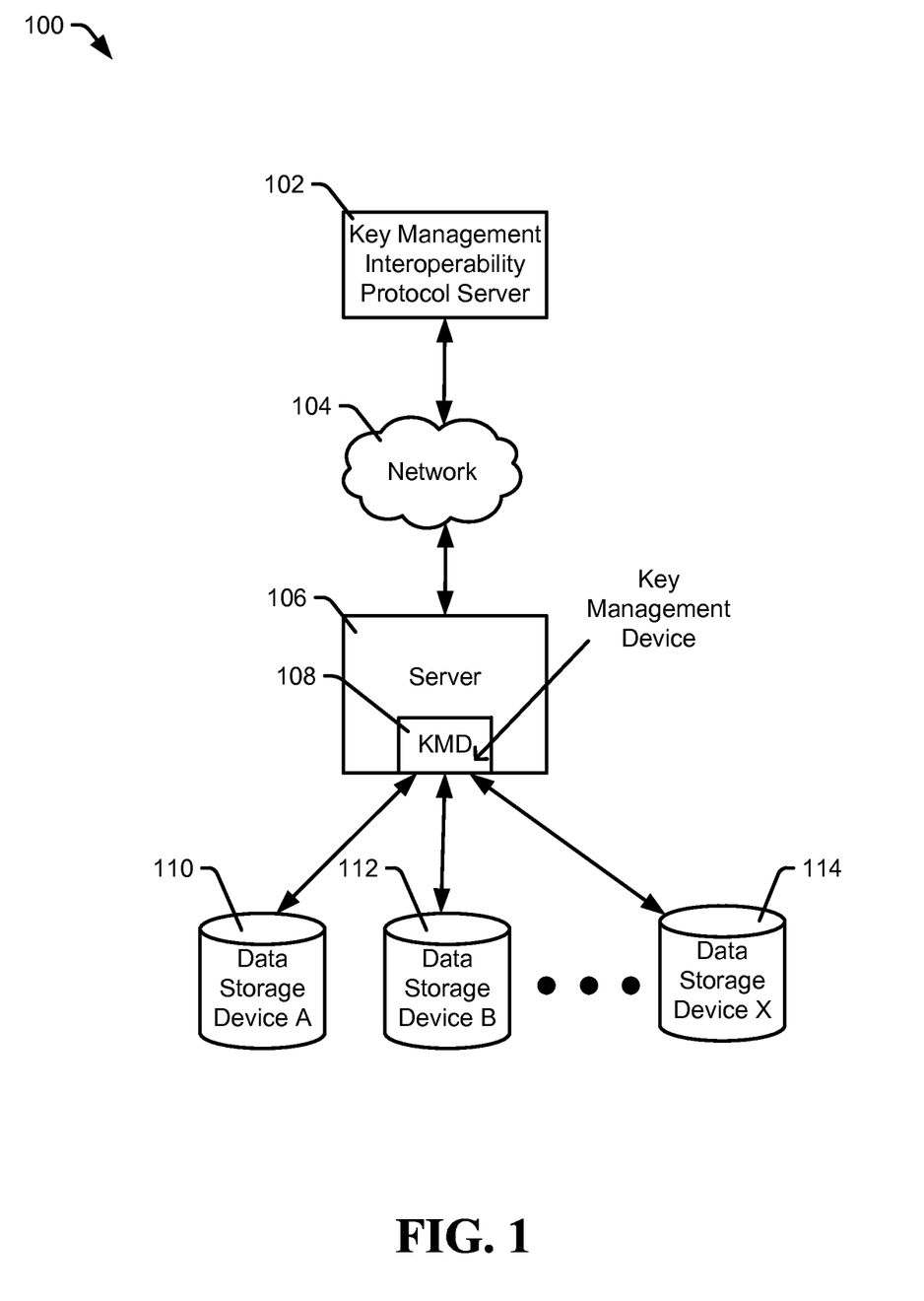
FIG. 1 is a diagram of a system of a removable circuit for unlocking self-encrypting data storage devices, in accordance with certain embodiments of the present disclosure.

Referring to FIG. 1, certain embodiments of a system of a removable circuit for unlocking self-encrypting data storage devices are shown and generally designated 100. System 100 can include a key management interoperability protocol ("KMIP") server 102 coupled to a server 106 via a network 104. The server 106 may be a data server, file system server, metadata server, web server, application server, or other server. In some embodiments, the server 106 may be a redundant array of independent discs ("RAID") server. The server 106 may include a key management device ("KMD") 108, and may be coupled to data storage devices ("DSDs") A 110, B 112, and X 114, for example. In some embodiments, the network 104 may be a wired or wireless network.

The DSDs A 110, B 112, and X 114, may be self-encrypting drives ("SEDs"). SEDs may encrypt data by itself, such as before data is stored to a storage medium (e.g. magnetic discs or flash memory) and decrypt the data as the data is retrieved from the storage medium. An SED may encrypt data with an internally stored encryption key that is not accessible outside of the SED, and may further decrypt encrypted data with a corresponding decryption key. In some examples, an SED's encryption key may be a symmetric key used by an SED's encryption engine to encrypt plaintext (i.e. data in transit) into cipher text (i.e. encrypted data) when the data is stored to the SEDs and to decrypt cipher text into plain text when data is read from the SEDs.

An SED may be said to be unlocked when a correct symmetric key (or other key combinations) has been provided, thus allowing the encrypted data to be decrypted. An SED may be said to be locked when the data remains encrypted and a correct symmetric key (or other key combinations) has not been provided. In some cases, SEDs become locked when power is removed to prevent an unauthorized person from taking the SED and accessing the data. In order to gain access to the data when power is restored, the correct encryption key(s) must be provided to the SED(s). In some embodiments, the encryption keys may be stored remotely on the KMIP server 102.

In some embodiments, the KMD 108 may transmit a request to the KMIP server 102 for encryption keys corresponding to DSDs A 110, B 112, and X 114. When the KMIP server 102 replies with the requested encryption keys, the KMD 108 can receive the encryption keys, and may unlock the DSDs A 110, B 112, and X 114.

In some examples, the KMD 108 may determine if there are any unregistered SEDs coupled to the server 106. Unregistered SEDs may be SEDs for which no encryption key is stored in the KMIP server 102. For example, if another DSD is coupled to the server 106, that DSD may be said to be unregistered if the KMIP server 102 does not already have an encryption key associated with the newly coupled DSD. To register unregistered DSDs, the KMD 108 may obtain a unique identifier for the unregistered DSDs, and provide the unique identifier and a request for a security identification ("ID") corresponding to the unique identifier to the KMIP server 102. The KMIP server 102 can create the security ID and a corresponding encryption key. The encryption key can be stored on the KMIP server 102, and the KMIP server 102 may provide the security ID to the KMD 108. The KMD 108 can lock the SED with the security ID, thus completing an SED registration process. From that point on, the SED may be unlocked with the encryption key stored in the KMIP 102.

In some embodiments, the KMD 108 may connect to be removable from the server 106 by physically and electrically connecting and disconnecting the KMD 108 to the server 106 without physically modifying the server 106. For example, the KMD 108 may be a peripheral component interconnect express ("PCIe") device that may be physically and electrically connected to the server 106 via a PCIe slot in the server's 106 motherboard without physically modifying (e.g. moving, partially or wholly disassembling, disconnecting, etc.) components (e.g. mother board, graphics cards, processors, memory modules, expansion boards, DSDs, network adapters, power connectors, etc.) in the server 106. For example, to install the KMD 108 in the server 106, a user can simply select an available interface slot in a motherboard, line up the connectors of the KMD 108 with connectors in the slot, and press down on the KMD 108 until the KMD 108 is securely connected. To remove the KMD 108 from the server 106, a user can pull on the KMD 108 until it is free from the motherboard. In some cases, connecting and disconnecting the KMD 108 in this manner can be accomplished without physically modifying the server 106. In some examples, the KMD 108 may be connected to other circuits in the server, such as an expansion card. In some examples, the KMD may connect to be removable from the server 106 via intelligent drive electronics ("IDE"), serial advanced technology attachment ("SATA"), or other interface.

In some examples, the KMD 108 may be removed from a server and connected to another server with little to no modification. For example, the KMD 108 may be a universal serial bus ("USB") based flash memory, compact disc, digital versatile disc, or other removable device with an accessible to memory. When the KMD 108 is removed from one server and connected to another server, a user need only to pull out a USB based flash memory or eject compact disc from one server and insert the KMD 108 into another server.

In some embodiments, the KMD 108 may be connected or disconnected from the server 106 only when the server 106 is powered off. For example, the server 106 may have to be powered off to connect or remove the KMD 108, such as when the KMD 108 is a PCIe device. However, in some embodiments, the KMD 108 can be configured to connect to be removable from the server 106 by connecting and disconnecting to the server 106 while the server 106 is still powered on. For example, the KMD 108 may be a USB based flash drive that may be inserted and removed from the server 106 while the server 106 is still powered on, in accordance with USB protocols. In some cases, a user may insert the USB based flash drive into an external USB interface of the server 106 while the server 106 is powered on to add, remove, load, or modify data in the KMD 108. In some examples, the user may physically remove the KMD 108 from the external USB interface of the server 106 while the server 106 is powered on.

In some examples, the KMD 108 may located outside of the server 106, and may be physically connected and disconnected from the server 106 via an external interface without physically modifying the server 106. For example, the KMD 108 can connect to be removable from the server 106 via a high serial bus, such as IEEE 1394, or other interface. In some embodiments, the KMD 108 can be a memory device that can connect to the server 106 via a USB interface, external serial advanced technology attachment ("eSATA"), or other interface. When the KMD 108 is connected to the server 106 via an external interface, the user can physically insert the KMD 108 into the appropriate interface directly or with interface cables. The KMD 108 may receive power from the server 106, or may be powered with a separate power supply. To remove the KMD 108 from the server 106, a user may physically remove the KMD 108 from the corresponding interface in the server 106. The user can reconnect the KMD 108 to the server 106 or optionally connect the KMD 108 to another server.

Figure 2:
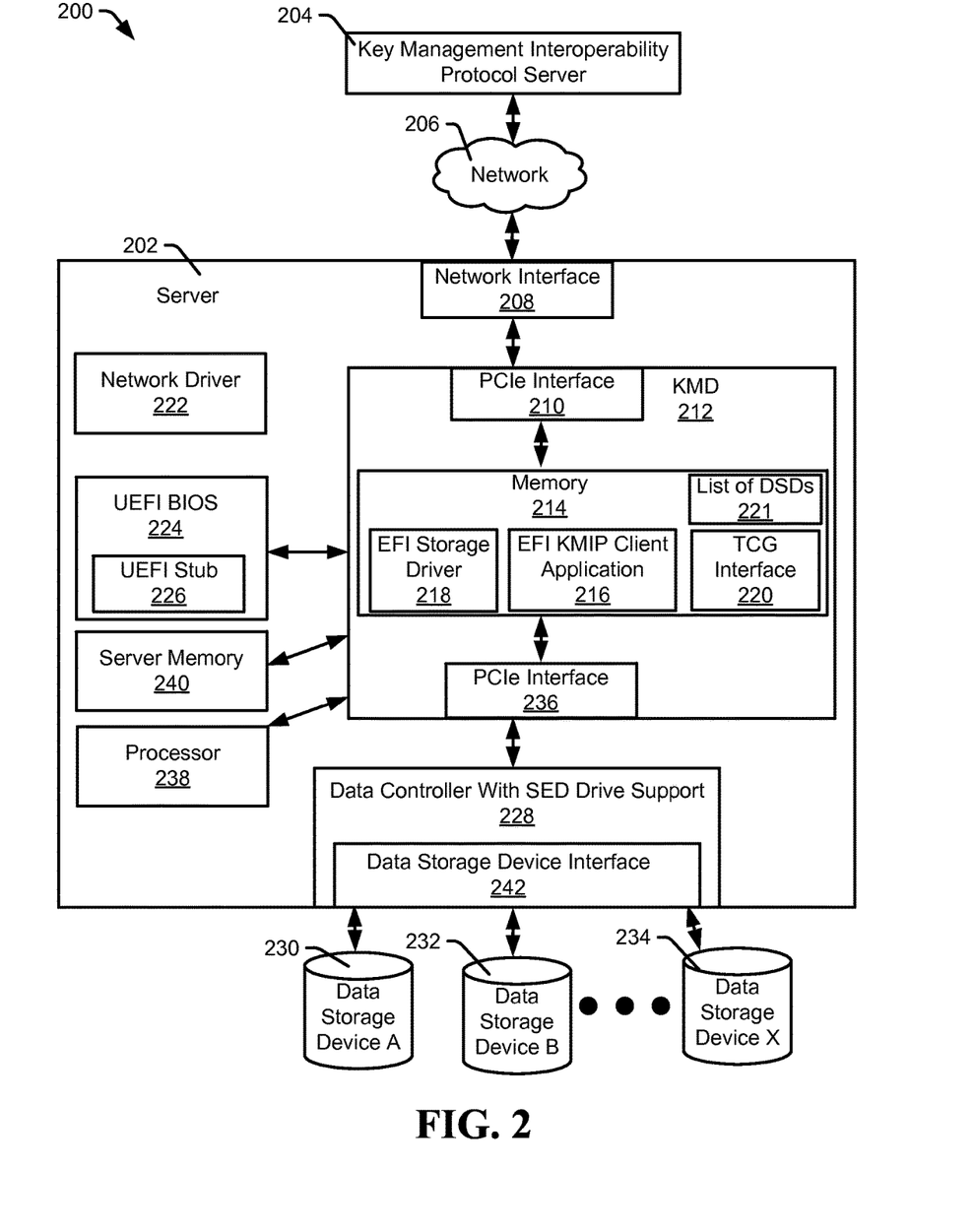
FIG. 2 is a diagram of a system of a removable circuit for unlocking self-encrypting data storage devices, in accordance with certain embodiments of the present disclosure.

Referring to FIG. 2, certain embodiments of a system of a removable circuit for unlocking self-encrypting data storage devices are shown and generally designated 200. The system 200 may be an example of the system 100, according to certain embodiments. The system 200 may have a KMIP 204 communicatively coupled to a server 202 via the network 206 and the network interface 208.

The server 202 may be coupled to DSD A 230, DSD B 232, and DSD X 234 via data controller 228. In some examples, DSDs A 230, B 232, and X 234 may be SEDs, and may be coupled to the data controller 228 via a DSD interface 242. The DSD interface 242 may be a serial-advanced-technology interface ("SATA"), serial-attached small-computer-system-interface ("SAS"), or other interface. The controller 228 may be a redundant array of independent discs ("RAID") controller or other data storage controller.

The server 202 can include a server memory 240, network driver 222, processor 238, and unified extensible firmware interface ("UEFI") basic input/output system ("BIOS") 224. In some examples, the processor 238 may be a circuit including one or more processing devices, such as central processing units, microprocessors, or other processors. The UEFI BIOS 224 can include a UEFI stub 226, and may be coupled to a KMD 212. In some examples, the UEFI stub 226 may include instructions to call functions and load programs in the KMD 212 into the server memory 240. In some embodiments, the UEFI stub 226 may be created by a designer or manufacturer of the KMD 212 or its components, and stored in the memory 214. When the KMD 212 is first installed in the server 202, a program or application may install the UEFI stub 226 to an area of the server 202 that complies with UEFI storage standards. In some embodiments, the program or application that may install the UEFI stub 226 in the server 202 may also load information stored in the EFI storage driver 218, EFI KMIP client application 216, and trusted computing group ("TCG") interface 220 into server memory 240.

The KMD 212 may be a PCIe device attached to the server 202. The KMD 212 may communicate with the network 208 via PCIe interface 210, and may communicate with the controller 228 via PCIe interface 236. In some embodiments, the PCIe interface 210 may be the PCIe interface 236.

The KMD 212 may include a memory 214. The memory 214 may include a list of DSDs 221. The list of DSDs 221 can include a list of DSDs attached to the server 202. For example, the list of DSDs 221 can include unique identifiers corresponding to DSDs A 230, B 232, and X 234. In some examples, the list of DSDs 221 can include a registration status (e.g. registered or unregistered), or other information corresponding to DSDs A 230, B 232, and X 234.

Further, the KMD 212 may include software modules, such as extensible firmware interface ("EFI") storage driver 218, EFI KMIP client application 216, and TCG interface 220. In some embodiments, a module may be set of executable instructions stored in a memory that may be processed by a processor to cause the processor to perform certain tasks.

During operation, the server 202 may be powered on, and instructions in the EUFI BIOS 224 may be processed. In some embodiments, the UEFI BIOS 224 may be processed by the processor 238 or other processor. In some examples, the instructions in the UEFI BIOS 224 can include initializing the processor 238, determining if any PCIe devices are coupled to a PCIe interface, checking the server memory 240 for errors, performing system diagnostics, other operations, or any combination thereof. Further, the instructions in the UEFI BIOS 224 may be processed to load the network driver 222 into the server memory 240, thus providing access to the network interface 208.

Further, the UEFI BIOS 224 may be processed to determine if the UEFI stub 226 is present. When the UEFI stub 226 is present, instructions (e.g. function calls) in the UEFI stub 226 may be processed by the processor 238 to execute instructions in the memory 214. For example, the UEFI stub 226 may instruct the processor 238 to load the EFI storage driver 218 into the server memory 240. The EFI storage driver 218 may persist in the server memory 240 until the server 202 is rebooted or powered down.

Once the EFI storage driver 218 is loaded into the server memory 240, the processor 238 may be able to access data and process instructions in the memory 214. For example, the processor 238 may process instructions in the EFI KMIP client application 216 to determine if there are any SEDs coupled to the server 202. A request may be sent to the DSDs A 230, B 232, and X 234 requesting an encryption status indicator to determine if they are SEDs. For example, the processor 238 may process information in the TCG interface 220 to determine if the DSDs A 230, B 232, and X 234 are SEDs.

In some embodiments, a list of SEDs may be stored in the memory 214. Whenever an SED is connected or disconnected from the server 202, a unique indicator corresponding to the SED may be added or removed from the list. In some examples, the unique indicators may be manually added or removed from the list by a user. In some embodiments, the EFI KMIP client application 216 may determine the unique identifiers of attached SEDs to create a list of SEDs, or to update an existing list of SEDs.

Once the unique identifiers have been determined, the EFI KMIP client application 216 can transmit a request for encryption keys corresponding to the unique identifiers to the KMIP server 204. In some embodiments, the KMIP server 204 and the KMD 212 may be communicatively coupled using a cryptographic protocol, such as a secure sockets layer ("SSL") or transport layer security ("TLS"). SSL and TLS use certificates to provide security. A certificate may be a digital document that may include an encryption key, issuing authority, server name and client name, and other information. The EFI KMIP client application 216 may get the certificates from the EFI storage 218. The EFI storage driver 218 can determine information about the server 202 (e.g. server name, address), information about the KMIP server 204 (e.g. server name, address), and can get the certificates from the issuing authority.

The EFI KMIP client application 216 can receive the encryption keys from the KMIP server 204. The EFI KMIP client application 216 may then provide the encryption keys to the DSDs A 230, B 232, and X 234 to unlock the DSDs A 230, B 232, and X 234. In some embodiments, the EFI KMIP client application 216 may unlock the DSDs A 230, B 232, and X 234 using TCG protocols. For example, in systems using TCG protocols, encryption hardware may be included in the controller 228 as well as in the DSDs A 230, B 232, and X 234, which may allow the DSDs A 230, B 232, and X 234 to operate at a full data rate without performance degradation.

The EFI KMIP client application 216 may call TCG libraries from the TCG interface 220. The TCG libraries can contain commands to unlock the DSDs A 230, B 232, and X 234. In some cases, a command to unlock the DSDs A 230, B 232, and X 234 may be provided with the encryption keys.

Once the encryption keys and the commands to unlock have been provided to the DSDs A 230, B 232, and X 234, the EFI KMIP client application 216 may determine if the DSDs A 230, B 232, and X 234 have been unlocked. In some examples, the DSDs A 230, B 232, and X 234 may automatically send a lock/unlock status indicator to the EFI KMIP client application 216 to indicate if the unlock operation was successful. In some cases, the TCG interface 236 may send a command to the DSDs A 230, B 232, and X 234 requesting a response indicating whether the unlock operation was a success or a failure. In some examples, the EFI KMIP client application 216 may transmit a query to the DSDs A 230, B 232, and X 234 to request the status indicator. The DSDs A 230, B 232, and X 234 may send a message to the EFI KMIP client application 216 indicating whether they have been unlocked. When one or more of the DSDs A 230, B 232, and X 234 have not been unlocked, the EFI KMP client application 216 may create an error indicator. In some cases, the EFI KMP client application 216 may create the error indicator when a threshold amount of time has passed since the EFI KMIP client application 216 sent the encryption keys to the DSDs A 230, B 232, and X 234, if the status indicator has not been received. The error indicator can indicate which of the DSDs were not unlocked. In some embodiments, the EFI KMIP client application 216 may store the error to a log file. The log file may be stored in the memory 214, server memory 240, other memory, or any combination thereof.

Figure 3:
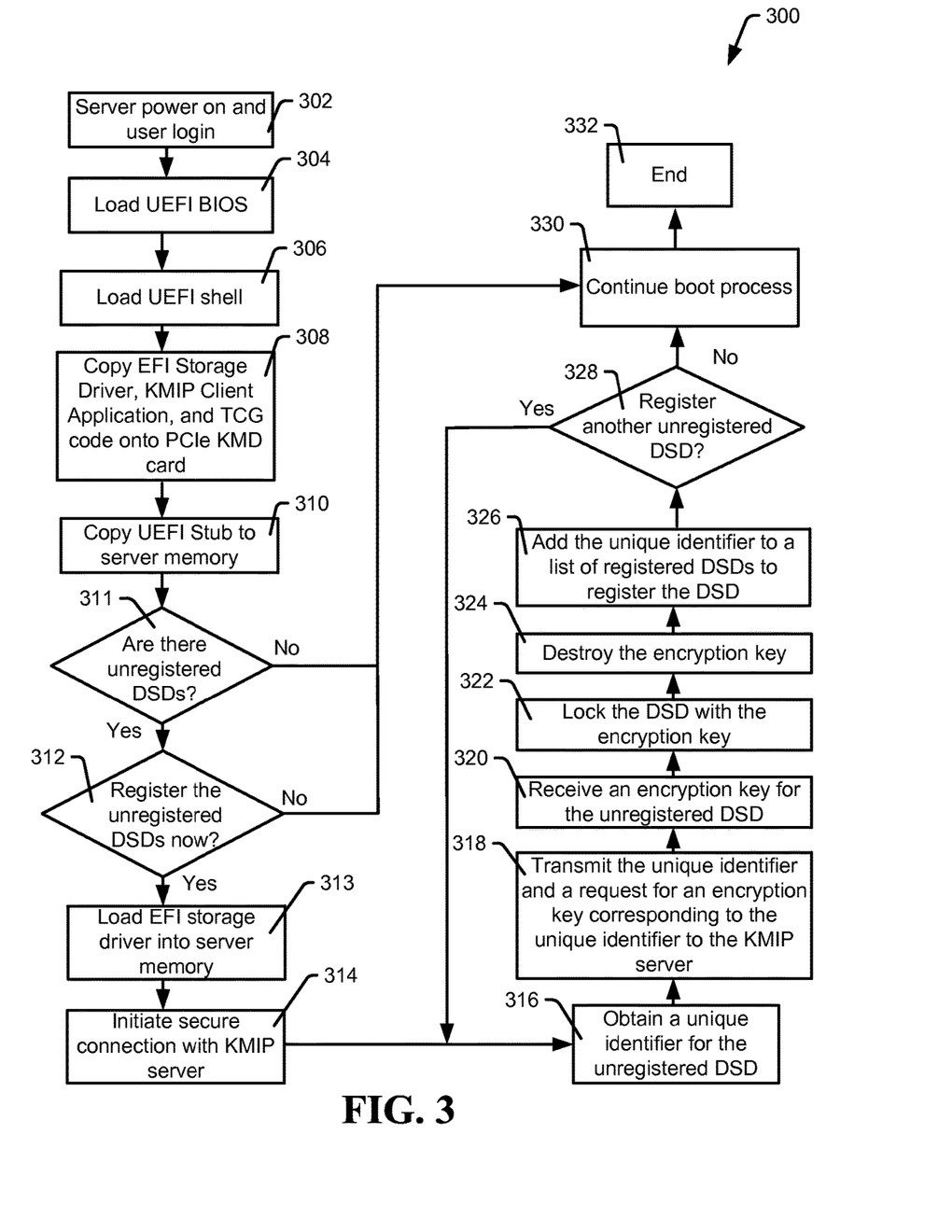
FIG. 3 is a flowchart of a method for unlocking self-encrypting data storage devices with a removable circuit, in accordance with certain embodiments of the present disclosure.

Referring to FIG. 3, certain embodiments of a method for unlocking self-encrypting data storage devices with a removable circuit are shown and generally designated 300. The method 300 may be implemented by the systems 100 and 200, according to certain embodiments. The method 300 can initialize systems 100 and 200 and register DSDs with a KMIP server.

The method 300 can include powering on a server. Powering on a server may include an operator logging into the server and entering a password, at 302, and loading a UEFI BIOS into memory, at 304. In some examples, the UEFI BIOS may include instructions to load a network driver corresponding to the server's network interface into a server memory. When the network driver is loaded in a server memory, applications may access the network interface.

The method 300 may include loading a UEFI shell into the server memory, at 306. A UEFI shell can provide a shell environment, which can be used to execute UEFI applications. In some examples, a shell environment may provide an interface between a user and internal parts of an operating system, such as the UEFI BIOS. For example, a UEFI shell may include a graphical user interface ("GUI") which can allow a user to launch applications or perform file system operations at the click of a mouse. In some examples a UEFI shell may include a command line interface ("CLI"). A CLI can allow a user or application to enter in commands and data via a command line. A command line can receive alphanumeric characters or symbols inputted from a user or application for storage or execution.

Methods used for launching a UEFI shell may depend on the manufacturer and model of the server's motherboard. In some cases, a motherboard may provide a direct option in firmware setup for launching the UEFI shell. For example, the UEFI shell may be available for launching when a compiled x86-64 version of the shell is available as "<EFI_SYSTEM_PARTITION>/SHELLX64.EFI". Some systems may have a UEFI shell embedded into the UEFI BIOS which can be launched by appropriate key press combinations. For example, a user might press the "delete" key or "F8" key on their keyboard at an appropriate time during the server's boot process. In other examples, the UEFI shell may be launched by storing the UEFI shell onto a bootable or non-bootable USB flash drive, compact disc, digital versatile disc, or other storage device. In some examples, a boot option associated with the compiled version of the UEFI shell may be manually added to the code of the UEFI shell via a command, such as a "bcfg" command or "efibootmgr" command. In some examples, a bcfg command can allow a user to create a boot entry by modifying a memory in which the UEFI shell is stored. In some examples, the efibootmgr command can create, reorder, and update boot entries. The compiled version of the UEFI shell may be an application created by compiling source code.

The UEFI shell may be configured to load a boot loader application into the server's memory. A boot loader may be an application that can be called to load data and other applications into the server's memory. Applications that are loaded into the server's memory may be executed (processed), and data loaded into the server's memory may be available to applications.

The method 300 may include copying an EFI storage driver, EFI KMIP client application, and TCG interface code onto a KMD card, at 306. In some examples, the EFI storage driver, EFI KMIP client application, and TCG interface code may be loaded into a memory of the KMD card by the boot loader. For example, a user may install the EFI storage driver, EFI KMIP client application, and TCG interface via the UEFI shell during an initial installation or during periodic updates. The EFI storage driver, EFI KMIP client application, and TCG interface code may be loaded to the server memory from a USB flash drive, compact disc, hard disc, or other storage device, and copied to the KMD card. In some examples, the EFI storage driver, EFI KMIP client application, and TCG interface code may be downloaded from a server via a network interface and stored to the KMD. In some examples, examples the EFI storage driver, EFI KMIP client application, and TCG interface code may be installed in the KMD when the KMD is manufactured. When the EFI storage driver, EFI KMIP client application, and TCG interface code are already on the KMD and no updates are to be made, 308 may be bypassed. In some embodiments, the EFI storage driver, EFI KMIP client application, and TCG interface code may be stored to the KMD using security protocols to verify their authenticity.

The method 300 may copy a UEFI stub code into the UEFI shell, at 310. In some embodiments, the UEFI stub code may be installed into the UEFI shell during an initial installation of the KMD into the server. The UEFI stub code may be copied from a hard disc, flash memory, compact disc, or other memory, and inserted into the UEFI shell's code. In some embodiments, the UEFI stub code may be included in the KMD, or may be downloaded via the server's network adapter. In some cases, the UEFI stub may include instruction code to call functions stored in a KMD. For example, the UEFI stub may include instructions to load the EFI storage driver, EFI KMIP application, and TCG interface from the KMD into the server's memory. A boot loader can process the instructions to load the EFI storage driver from the KMD into the server's memory. In some cases, when a UEFI stub is already installed into the UEFI shell's code, 310 may be bypassed.

The method 300 can include determining if there are any unregistered DSD attached to the server, at 311. In some embodiments, unregistered DSDs may be determined automatically by polling DSDs attached to the server and comparing their unique identifiers to a list of registered devices stored in a memory. When unique identifiers obtained from the DSDs are not in the list of registered devices, those DSDs may be registered. In some cases, a user may determine that there are unregistered DSDs coupled to the server. For example, when a user connects a DSD to the server via a DSD interface, the DSD may be unregistered. When there are no unregistered DSDs attached to the server, the method can including continuing the server's boot process, at 330.

When there are unregistered DSDs attached to the server, the method 300 can include determining if any of the unregistered DSDs should be registered, at 312. In some examples, a user may start a registration process of one or more unregistered DSDs by entering a command to register a selected unregistered DSD via a UEFI shell. In some examples, instructions may be included in a KMD or UEFI stub to automatically detect and register unregistered DSDs.

When one or more unregistered DSDs are to be registered, the method 300 can include loading an EFI storage driver into memory, at 313, and initiating a secure connection with a KMIP server, at 314. In some embodiments, a user can load the EFI storage driver in the server's memory via the UEFI shell. When the EFI storage driver is loaded into the server's memory, code in the KMD's EFI KMIP client application module and TCG interface module may be accessible to the UEFI shell. Thus, the UEFI shell can load instructions in an EFI KMIP client application in response to the user's command to initiate a secure connection with the KMIP server, at 314. In some embodiments, the EFI KMIP client application may connect with the KMIP server using a TLS or SSL protocol to secure the connection.

The method 300 can include obtaining a unique identifier for an unregistered DSD, at 316. In some embodiments, the unique identifier may be obtained automatically by the KMD or other circuit. The KMD may send a command to the DSD requesting the unique identifier. When the DSD provides the KMD with its unique identifier in response to the command, the KMD may store the unique identifier in a memory. In some embodiments, a user may enter the unique identifier into a memory via the UEFI shell. In some cases, a user may type the unique identifier into a command line interface, and the command line interface can store the unique identifier to a memory. The memory may be located in the KMD, the server, or other location.

The method 300 can include transmitting the unique identifier and a request for an encryption key corresponding to the unique identifier to the KMIP server, at 318. In some embodiments, the KMD may send one or more packets to the KMIP server via the secure connection. The packets may include the unique identifier, and a command instructing the KMIP server to create an encryption key corresponding to the unique identifier. The KMIP server may create the encryption key, and store the encryption key and the unique identifier to a memory accessible to the KMIP server. The KMIP server can transmit the encryption key back to the KMD.

At 320, the method 300 can include receiving the encryption key from the KMIP server. In some examples, the encryption key may be received by the KMD and stored to a memory. Once the encryption key has been received, the method 300 can include locking the DSD corresponding to the unique identifier with the encryption key. In some embodiments, the KMD may send a TCG command and the encryption key to the DSD with instructions to lock with the encryption key. A TCG command may be a command that conforms to TCG protocols. The TCG command and the encryption key can be transmitted to the DSD via a TCG interface. The command can include a request for an indicator to indicate if the lock operation was successful. If the lock operation was not successful, the command may be resent, aborted, or suspended pending action from the user. Also, an error message may be displayed and the error logged. The log can be stored to the KMD.

When the lock operation was successful, the user may be provided with an indicator indicating a successful lock operation, and the encryption key will be destroyed, at 324. For example, the encryption key may be erased from the memory in which it was stored. The unique identifier may be added to a list of registered DSDs, at 326. In some cases, the unique identifier may automatically be added to a list of registered DSD already stored in the KMD. In some embodiments, a user may manually enter the unique identifier to the list of registered DSDs. Once the unique identifier is added to the list of registered DSDs, the DSD can be considered registered and the successful lock operation can be logged. The log can be stored to the KMD.

The method 300 can include determining if there are other unregistered DSDs to register, at 328. In some embodiments, an interface, such as the command line interface, can prompt the user to indicate whether there are more unregistered DSDs to register. In some embodiments, a KMD may automatically determine if there are other DSDs to register. For example, unregistered DSDs may be determined automatically by polling DSDs attached to the server and comparing their unique identifiers to a list of registered devices stored in a memory. When there are more unregistered DSDs to register, the method 300 can include obtaining a unique identifier for another unregistered DSD, at 316. When there are no more unregistered DSDs to register, the method 300 can include continuing the boot process, at 300. In some examples, the boot process may include detecting or initializing other hardware components, loading applications into a memory, loading an operating system into memory, other tasks, or any combination thereof. The method 300 can end, at 332.

One or more steps in the method 300 may be optional. For example, in certain embodiments, the steps 308 and 310 may be removed. Further, some ordering in which the steps are executed in the method 300 may be changed.

Figure 4:
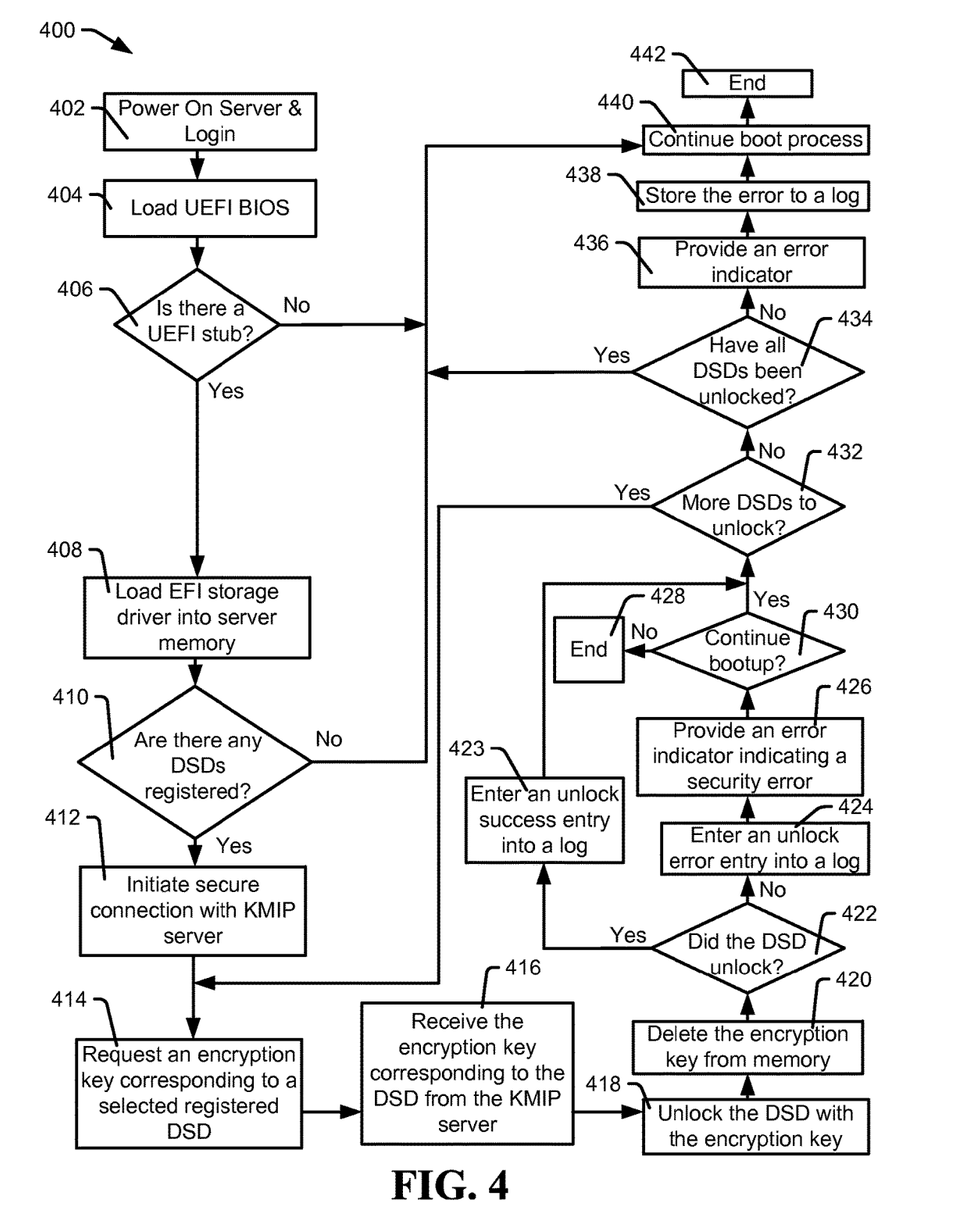
FIG. 4 is a flowchart of a method for unlocking self-encrypting data storage devices with a removable circuit, in accordance with certain embodiments of the present disclosure.

Referring to FIG. 4, certain embodiments of a method for unlocking self-encrypting data storage devices with a removable circuit are shown and generally designated 400. The method 400 may be implemented by the systems 100 and 200, according to certain embodiments. The method 400 can unlock DSDs using encryption keys obtained from a key server.

The method 400 can include powering on a server, at 402, and loading a UEFI BIOS into memory, at 404. In some examples, a server may perform a power on self-test ("POST"), load a network driver, load other drivers or applications, or any combination thereof. For example, a server's motherboard may include one or more processors, such as a central processing unit ("CPU"). The processors may load drivers or applications into a server memory where the processors may then process the drivers or applications.

At 406, the method 400 can determine if a UEFI BIOS includes a UEFI stub. In some embodiments, a processor may determine if the UEFI BIOS includes a UEFI stub as code in the UEFI BIOS is processed. When the UEFI BIOS does not include a UEFI stub, the method 400 can include continuing a boot process, at 440, and when the boot process is finished, the method 400 can end, at 442.

When the UEFI BIOS includes a UEFI stub, the UEFI stub can be processed by a processor to load an EFI storage driver into a server memory, at 408, and the method 400 can include determining if there are any registered DSDs coupled to the server, at 410. In some embodiments, registered DSDs may be determined by a KMD. The KMD may include information that, when processed by a processor, cause the processor to transmit a command to each of the attached DSDs requesting their unique identifiers. In some cases, the command may be sent to the DSDs via a data controller with SED support and a TCG interface. The unique identifiers obtained from the attached DSDs can be compared against a list of registered DSDs stored in a memory, such as a memory in the KMD. When none of the unique identifiers obtained from the attached DSDs correspond to the unique identifiers in the list of registered DSDs, the method 400 can include continuing the server's boot process, at 440, and ending, at 442.

When at least one of the unique identifiers obtained from the DSDs coupled to the server corresponds to a unique identifier in the list of registered DSDs, a secure connection with a KMIP server can be initiated, at 412. For example, instructions stored in a KMD may be executed by a processor to initiate a TLS or SSL connection between a KMD a KMIP server. In some examples, instructions in the KMD may be executed by a processor to cause the processor to send and receive commands and data to a KMIP server via a PCIe interface and a network interface.

Once a secure connection with a KMIP server has been established, the method 400 can include requesting a security key (i.e. encryption key) corresponding to a selected registered DSD, at 414, by its unique stored ID. In some embodiments, instructions stored in a KMD may be executed to cause the processor to send a request to the KMIP server for an encryption key corresponding to a selected unique identifier. The request may include one or more packets of data transmitted via the secure connection. The packets of data can include the selected unique identifier, a command to obtain the encryption key corresponding to the selected unique identifier, server identification, or other information.

The method 400 can include receiving the encryption key corresponding to the selected unique identifier from the KMIP server, at 416. When the encryption key is received from the KMIP server via the secure connection, the encryption key may be stored to a memory, such as a memory in the KMD. If the encryption key is not received from the KMIP server, a DSD corresponding to the encryption key will not be unlocked, and an error message can be reported to a user, such as via a UEFI shell or other interface. Further, an entry may be included in a log file indicating the unsuccessful unlock operation, and the log file may be stored to a memory.

The registered DSD corresponding to the encryption key and the selected unique identifier may be unlocked by the encryption key, at 418. In some embodiments, a KMD may include instructions that, when executed by a processor, cause the processor to transmit the encryption key and an unlock command to the registered DSD. At 420, the method 400 can include removing the encryption key from the memory. In some embodiments, an area of the memory in which the encryption key was stored may be overwritten with data patterns, such as a pattern of 0's or 1's, to erase the security key from the memory. Further, other secure ways of deleting an encryption key may be utilized.

The method 400 can include determining if the DSD was successfully unlocked, at 422. In some examples, the KMD can determine if the DSD was successfully unlocked based on the DSD's response to the unlock command. For example, a DSD can transmit a successful return to the KMD when the unlock command was successfully executed, and a non-successful return to the KMD when the unlock command was not successfully executed.

The success or failure of each DSD to unlock may be logged. For example, when the DSD was successfully unlocked, an entry indicating the DSD was successfully unlocked may be entered into a log, at 423, and the method 400 can include determining if there are more DSDs to unlock, at 432. In some embodiments, the log may be stored in the KMD, in a server memory, in a portable memory, in another memory, or any combination thereof. When the DSD was not successfully unlocked, the method 400 can include entering an entry indicating the DSD was not successfully unlocked into a log of errors, at 424, and providing an error indicator indicating a security error, at 426. The error indicator may be provided via the UEFI BIOS shell, audible beeps, or with other indicators.

In some embodiments, the method 400 may include providing a user with an option to stop the server's bootup process, at 430. The user may enter their decision to continue or stop the bootup process via the UEFI BIOS shell or other interface when the DSD was not successfully unlocked. When the user elects to stop the bootup process, the method 400 can end, at 432. In some examples, the user may not be provided with an option to continue or stop the bootup process, at 430. Rather, the method 400 may automatically end, at 428, determine if there are other DSDs to unlock, at 432, or perform other operations.

When the user elects to continue the bootup process, the method 400 can include determining if there are any other registered DSDs to unlock, at 432. In some embodiments, the KMD may include instructions that when executed by the processor, cause the processor to compare the unique identifiers obtained from the attached DSDs against a list of registered DSDs. If another of the unique identifiers obtained from the attached DSDs corresponds to a unique identifier from the list of registered DSDs, a request for an encryption key corresponding to another selected unique identifier may be transmitted to a KMIP server, at 414.

When there are no more registered DSDs to unlock, the method 400 can include determining if all of the DSDs coupled to the server were unlocked, at 434. In some examples, the KMD can determine when there are no more registered DSDs to unlock by requesting a registration status, an encryption status, or both, from the attached DSDs. For example, a command may be sent to all of the attached DSDs to determine if any of the DSDs are still locked, or do not correspond to any unique identifier in the list of registered DSDs.

When all of the DSDs are unlocked, the method 400 can include continuing a boot process, at 440. When some of the DSDs are still locked or are not in the list of registered DSDs, the method 400 can include providing an error indicator indicating some of the DSDs have not been successfully unlocked, at 436, and storing the error to a log, at 438.

In some systems, multiple encryption keys may be obtained from a KMIP server at a time. For example, the list of registered DSDs may be transmitted to the KMIP server in a single request for encryption keys, and the KMIP server may transmit all of the requested encryption keys in a single response.

In some embodiments, an order in which the steps in the method 400 may be changed. For example, in certain embodiments, operation 428 may occur prior to operation 426.

Figure 5:
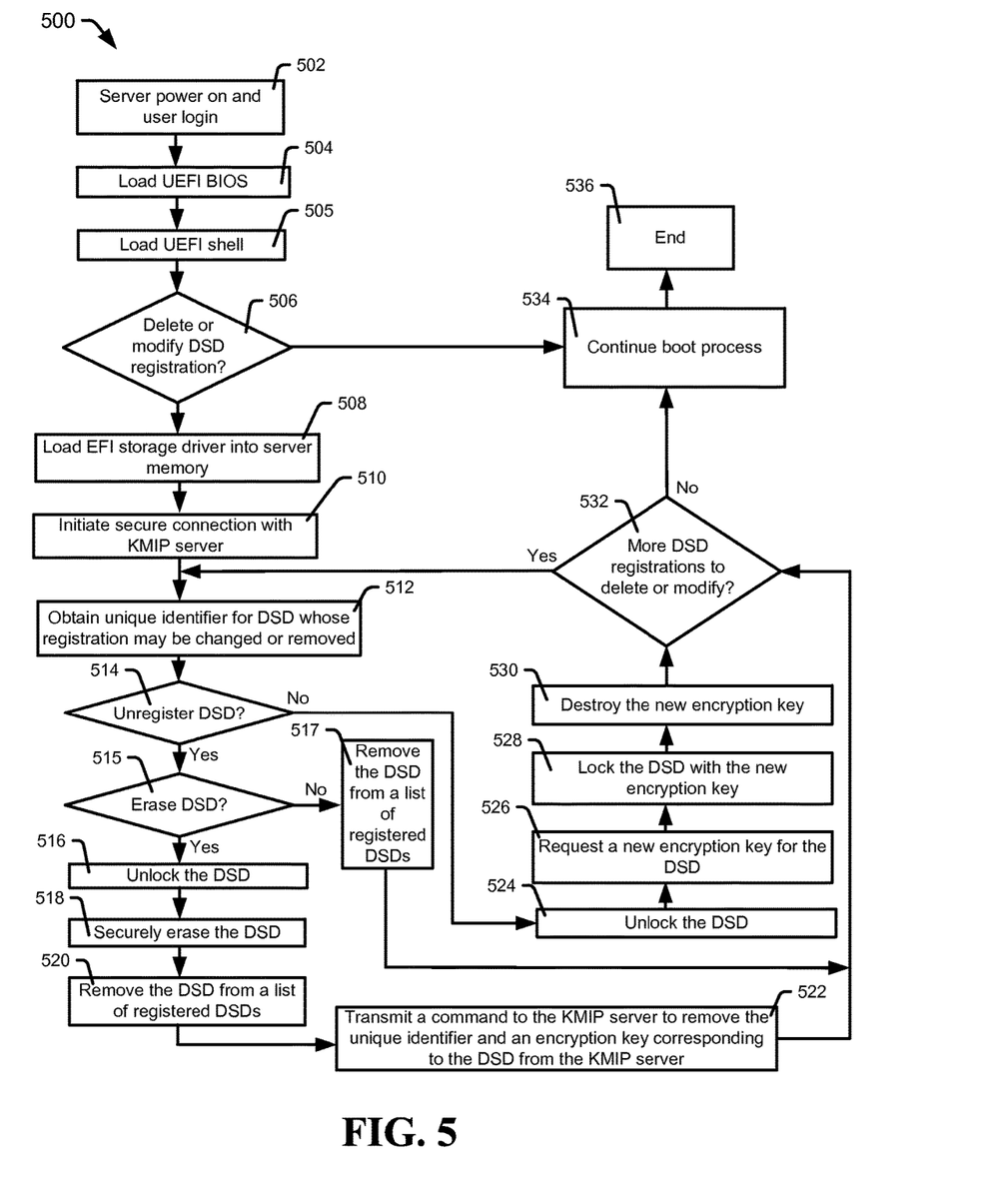
FIG. 5 is a flowchart of a method for unlocking self-encrypting data storage devices with a removable circuit, in accordance with certain embodiments of the present disclosure.

Referring to FIG. 5, certain embodiments of a method for unlocking self-encrypting data storage devices with a removable circuit are shown and generally designated 500. The method 500 may be implemented by the systems 100 and 200, according to certain embodiments. The method 500 can delete or modify DSD registration.

The method 500 can include powering on a server, at 502, loading a UEFI BIOS into memory, at 504, and loading a UEFI shell into the server memory, at 505. The UEFI shell may include a GUI, CLI, or both, and can enable a user to input instructions into a server memory for processing by a processor.

The method 500 can include determining if any DSDs coupled to the server should be unregistered or have their registration modified, at 506. When a DSD is unregistered, its data may be erased, its unique identifier may be removed from a list of registered DSDs, and a corresponding encryption key may be removed from a KMIP server. When a DSDs registration is modified, an encryption key associated with the DSD may be changed.

In some embodiments, a user can determine if there are any DSDs to unregister or whose registration should be modified by inputting instructions into the server memory via the UEFI shell. The instructions can indicate if there are any DSDs to unregister or whose registration may be changed. In some examples, a KMD may automatically determine if there are any DSDs to unregister or whose registration may be changed. For example, the KMD may include a list of DSDs to unregister, a list of DSDs whose registration may be changed, other lists of DSDs, or any combination thereof. In some embodiments, a user can specify a list of drives to unregister or whose registrations may be changed. In some embodiments, a user can instruct the KMD to unregister or change the registration of the attached DSDs one by one. When there are no DSD registrations to change or remove, the method 500 can include continuing the boot process, at 534, and ending, at 536. When there are DSD registrations to change or remove, the method 500 can include loading an EFI storage driver into a server memory, at 508, and initiating a secure connection with a KMIP server, at 510.

At 512, the method 500 may determine a unique identifier corresponding to a DSD whose registration may be changed or removed. In some embodiments, a user may enter upload the unique identifier to a memory via the UEFI shell. In some embodiments, the unique identifier may be selected from a list of DSDs whose registration may be changed or removed. In some examples, the list may be stored in a KMD or other memory, such as a removable flash drive. In some examples, the KMD or other memory may include a list of DSDs to be unregistered and a list of DSDs whose registration may be changed, and the KMD can select the unique identifier from the lists.

The method 500 can include determining if the selected DSD may be unregistered, at 514. In some embodiments, a user can determine if the DSD may be unregistered. The user can upload an indicator to a memory via the UEFI shell indicating if the selected DSD may be unregistered. In some embodiments, a KMD can compare a DSD's unique identifier against a list of DSDs to be unregistered and a list of DSDs whose registration may change. When the selected unique identifier is selected from the list of DSDs to be unregistered, the selected DSD may be unregistered.

Once the selected unique identifier has been obtained, the method 500 can include determining if the DSD to be unregistered can be erased, at 515. In some circumstances, a user may unregister the DSD without securely erasing the data. In some embodiments, the user may be prompted to choose between securely erasing the DSD and then unregistering the DSD, or just unregistering the DSD without securely erasing the DSD via the UEFI shell. In some examples, an erase indicator corresponding to the DSD may be included in the list of DSDs. When the DSD is not to be erased, the method 500 can include removing the DSD from a list of registered DSDs, at 517, and determining if there are more DSD registrations to delete or modify, at 532.

When the DSD is to be erased, the method 500 can include unlocking the DSD to be unregistered, at 516. The unique identifier and a request for an encryption key may be transmitted to a KMIP server. When the KMD receives the encryption key from the KMIP server, the DSD can be unlocked. When the selected DSD may not be unregistered, the method 500 can include unlocking the selected DSD, at 524.

The method 500 can include securely erasing the unlocked DSD, at 518. In some embodiments, the DSD may be cryptographically erased. When a DSD is cryptographically erased, the encryption key for the DSD may be changed, and all record of the encryption key may be destroyed. Thus, any data on the DSD may not be accessible. In some examples, the DSD may be physically erased using write patterns to continually overwrite the DSD until no physical traces of useful data exist.

Once the DSDs have been securely erased, the method 500 can include removing the DSD from a list of registered DSDs, at 520. The list of registered DSDs can include unique identifiers corresponding to DSDs attached to a server. The list of registered DSDs may be opened and the unique identifier corresponding to the securely erased DSD may be removed.

The method 500 can include transmitting a command to the KMIP server to remove (e.g. delete, erase) the unique identifier and the encryption key corresponding to the DSD from the KMIP server, at 522. In some embodiments, the KMD may include instructions that, when executed by a processor, cause the processor to transmit a unique identifier and a command to the KMIP server. The command can include instructions for the KMIP server to securely erase the unique identifier and an encryption key corresponding to the unique identifier from the KMIP server. The KMIP server may transmit a response to the KMD to indicate if the unique identifier and corresponding encryption key were successfully erased.

At 532, the method 500 can include determining if there are more DSDs to be unregistered or DSDs whose registration may be changed, at 534. In some embodiments, a user may determine if there are any more DSDs to unregister or DSDs whose registration may be changed. In some examples, a processor may execute instructions included in the KMD to determine if there are any more DSDs in the list of DSDs to unregister and the list of DSDs whose registration may be changed to determine if there are DSDs that have not yet been selected. When there are no more DSD registrations to change or DSDs to unregister, the method 500 can include continuing a boot process, at 534, and ending, at 536.

When there are more DSD registrations to change or DSDs to be unregistered, the method 500 can include determining a unique identifier corresponding to a DSD whose registration may be changed or removed, and determining if the selected DSD may be unregistered, at 514. When the DSD may not be unregistered, the selected DSD may be unlocked, at 524.

The method 500 can include requesting a new encryption key for the DSD, at 526. In some embodiments, the KMD may include information that may be executed by a processor to transmit a request to the KMIP server for a new encryption key. The KMIP server may create a new encryption key and transmit the new encryption key to a memory in the KMD. When the KMIP server creates a new encryption key, the KMIP server can associate the new encryption key with the unique identifier, and erase the old encryption key stored in a memory accessible to the KMIP server.

When the new encryption key is received by the KMD, the method 500 can include locking the DSD with the new encryption key, at 528, and destroying the encrypting key stored in the KMD memory, at 530. The method 500 can include determining if there are more DSD registrations to modify or DSDs to unregister, at 532.

One or more steps in the method 500 may be optional. For example, in certain embodiments, step 505 may be removed. Further, in some examples, an order in which steps in the method 500 are executed may change. For example, step 522 may be executed before step 520.

Figure 6:
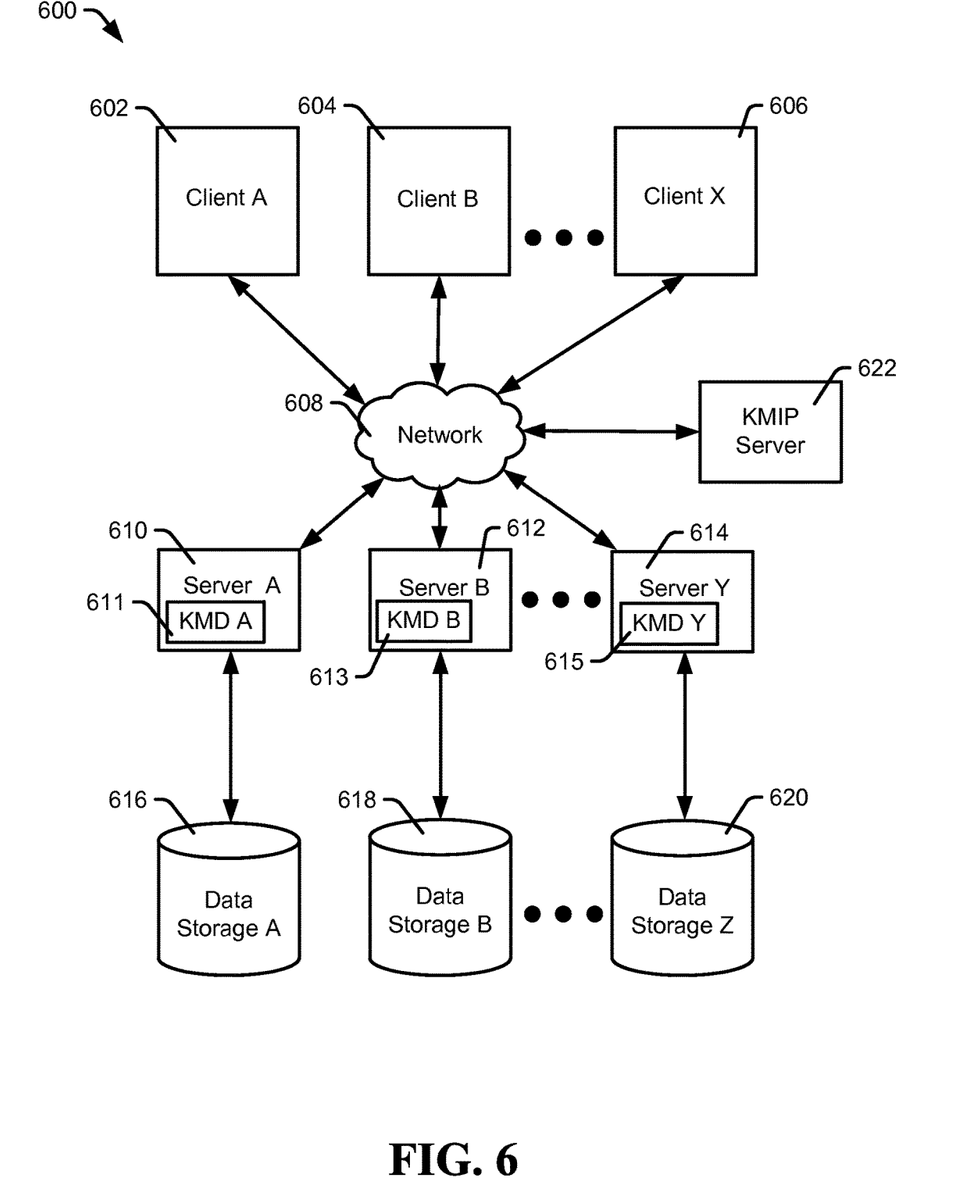
FIG. 6 is a diagram of a system of a removable circuit for unlocking self-encrypting data storage devices, in accordance with certain embodiments of the present disclosure.

Referring to FIG. 6, certain embodiments of a system of a removable circuit for unlocking self-encrypting data storage devices are shown and generally designated 600. The system 600 may be an example of the systems 100 and 200, according to certain embodiments. The system 600 may be an example of a distributed file system with a KMIP server, and may implement systems 100 and 200, and methods 300, 400, and 500, according to certain embodiments.

The distributed file system can allow one or more client nodes (e.g. A 602, B 604, and X 606) to access data in arrays of data storage (e.g. A 616, B 618, and Y 620) via a network 608. Servers A 610, B 612, and Y 614 can include KMDs A 611, B 613, and Y 615 may be coupled to the arrays of data storage A 616, B 618, and Z 620, respectively. In some examples, servers A 610, B 612, and Y 614 may store data to, or obtain data from, the arrays of data storage A 616, B 618, and Z 620 in response to client requests.

In some embodiments, the servers A 610, B 612, and Y 614, may be coupled to a KMIP server 622 via the network 608. When the servers A 610, B 612, and Y 614 power up, KMDs A 611, B 613, and Y 615 may transmit a request for encryption keys corresponding to the DSDs in data storage A 616, B 618, and Z 620, to the KMIP server 622.

In some examples, when the clients A 602, B 604, or X 606, want to store or obtain data, a file system operation request may be transmitted to one or more of the servers A 610, B 612, and Y 614 via the network 608. The servers A 610, B 612, and Y 614 may store all or part of the data to their corresponding data arrays of storage.

In some cases, servers A 610, B 612, and Y 614 may be file system servers, metadata servers, or other servers.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   connect to be removable from a first server via physical and electrical connections to the first server without physically modifying the first server, and disconnect from the first server without physically modifying the first server;
   transmit, from the first server to a second server, a request for an encryption key corresponding to data storage device ("DSD") coupled to the first server;
   determine a unique identifier corresponding to the DSD;
   provide the unique identifier corresponding to the DSD to the second server; and
   receive the encryption key from the second server and provide the encryption key to the DSD to unlock the DSD;
   unlock the DSD with the encryption key;
   determine if there is an unregistered DSD coupled to the first server, an unregistered DSD is a DSD that does not have a corresponding encryption key stored in the second server;
   obtain a unique identifier from the unregistered DSD;
   provide the unique identifier and a request for an encryption key to the second server;
   receive the encryption key from the second server; and
   lock the unregistered DSD with the encryption key to register the unregistered DSD.

2. The apparatus of claim 1 further comprising:
   the circuit configured to:
   provide an error indicator when the DSD is not unlocked.

3. The apparatus of claim 1 further comprising:
   the circuit configured to:
   determine if there is a registered DSD to be unregistered coupled to the first server;
   obtain a unique identifier from the registered DSD to be unregistered;
   provide the unique identifier and a request for an encryption key to the second server;
   receive the encryption key from the second server;
   unlock the registered DSD to be unregistered with the encryption key to unregister the DSD;
   erase the unregistered DSD; and
   transmit a command to the second server to remove the unique identifier and the encryption key from the second server.

4. The apparatus of claim 1 further comprising:
   the circuit configured to:
   determine if there is a DSD registration to modify corresponding to a DSD coupled to the first server;
   obtain a unique identifier from the DSD;
   provide the unique identifier and a request for an encryption key to the second server;
   receive the encryption key from the second server;
   unlock the DSD with the encryption key;
   provide the unique identifier and a request for another encryption key to the second server;
   receive the another encryption key from the second server; and
   lock the DSD with the another encryption key.

5. A system comprising:
   a management device configured to be connectable and removable from a first server via physical and electrical connections to the first server without physically modifying the first server, and disconnect from the first server without physically modifying the first server, the management device including:
   an interface circuit;
   a memory including executable instructions that, when executed by a processor, cause the processor to:
   perform an unlock process including:
      determine a unique identifier corresponding to a data storage device ("DSD") coupled to the first server via the interface circuit;
      transmit to a second server the unique identifier corresponding to the DSD and a request for an encryption key corresponding to the unique identifier;
      receive the encryption key from the second server and provide the encryption key to the DSD to unlock the DSD;
      unlock the DSD with the encryption key;
   perform a registration process including:

determine if there is an unregistered DSD coupled to the first server, an unregistered DSD is a DSD that does not have a corresponding encryption key stored in the second server;

obtain a unique identifier from the unregistered DSD;

provide the unique identifier and a request for an encryption key to the second server;

receive the encryption key from the second server; and lock the unregistered DSD with the encryption key.

6. The system of claim 5 further comprising: the memory includes instructions that, when executed by the processor, cause the processor to load a storage driver into a server memory of the first server to allow the processor to access instructions in the memory.

7. The system of claim 5 further comprising: the memory includes a list of DSDs, where the DSDs are coupled to the first server and instructions that, when executed by the processor, cause the processor to request encryption keys from the second server corresponding to the DSDs on the list.

8. The system of claim 5 further comprising: the memory includes instructions that, when executed by the processor, cause the processor to determine if the DSD has been unlocked; and provide an error indicator when the DSD has not been unlocked.

9. The system of claim 5 further comprising: the memory includes instructions that, when executed by the processor, cause the processor to establish a secure communication channel between the management device and the second server.

10. The system of claim 5 further comprising: the first server includes a unified extensible firmware interface ("UEFI") basic input/output system ("BIOS"); and the management device is coupled to the UEFI BIOS.

11. The system of claim 10 further comprising:

the first server includes the processor;

the processor configured to process instructions in the UEFI BIOS, causing the processor to:

load a storage driver from the management device into a server memory of the first server to allow the processor to access instructions in the memory;

process the instructions in the memory to:

determine the unique identifier corresponding to the DSD coupled to the first server;

transmit the request to the second server for the encryption key corresponding to the unique identifier; and provide the encryption key to the DSD to unlock the DSD.

12. The system of claim 5 further comprising: the management device is configured to be connected and removed from the first server while the first server is powered on.

13. The system of claim 5 further comprising: the management device is located outside of the first server; and the management device is physically connected and disconnected from the first server via an external interface without physically modifying the first server.

14. A method comprising:

determining an unique identifier corresponding to a data storage device ("DSD") coupled to a first server;

transmitting from a circuit to a second server the unique identifier corresponding to the DSD and a request for an encryption key corresponding to the unique identifier, where the circuit is configured to be connectable and removable from the first server via physical and electrical connections to the first server without physically modifying the first server, and disconnect from the first server without physically modifying the first server;

receiving the encryption key from the second server;

providing the encryption key to the DSD to unlock the DSD;

unlocking the DSD with the encryption key;

determining if there is an unregistered DSD coupled to the first server, an unregistered DSD is a DSD that does not have a corresponding encryption key stored in the second server;

obtaining a unique identifier for the unregistered DSD;

providing the unique identifier and a request for an encryption key to the second server;

receiving the encryption key from the second server; and locking the unregistered DSD with the encryption key to register the unregistered DSD.

15. The method of claim 14 further comprising: powering on the first server; and determining if a unified extensible firmware interface ("UEFI") basic input/output system ("BIOS") in the first server includes function calls to unlock the DSD.

16. The method of claim 15 further comprising:

when the UEFI BIOS includes function calls to unlock the DSD:

loading a storage driver corresponding to a management circuit into a memory of the first server;

initiating a secure connection with the second server;

requesting the encryption key from the second server;

unlocking the DSD with the encryption key; and providing an error indicator when the DSD does not unlock.

* * * * *